United States Patent Office 3,565,545
Patented Feb. 23, 1971

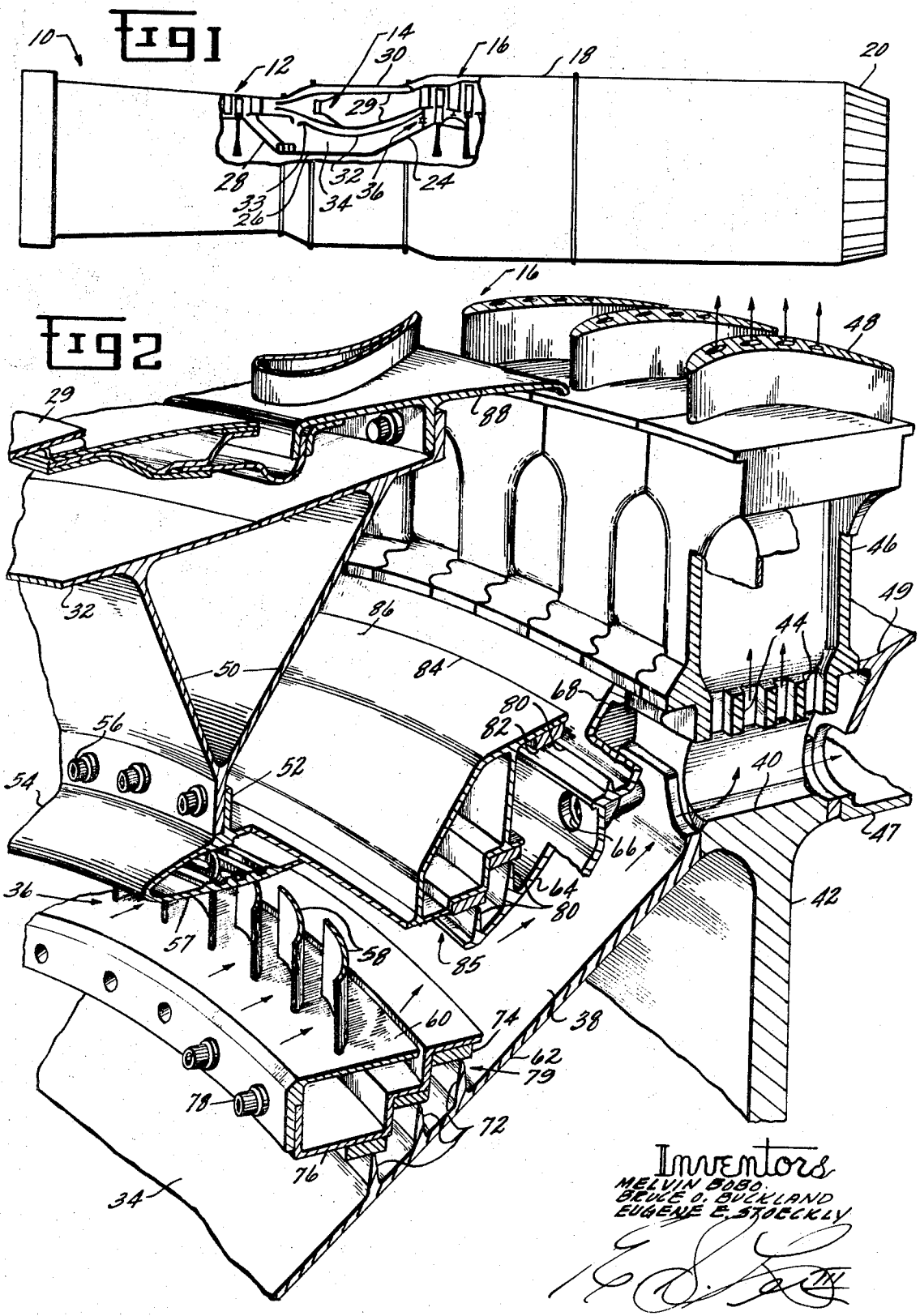

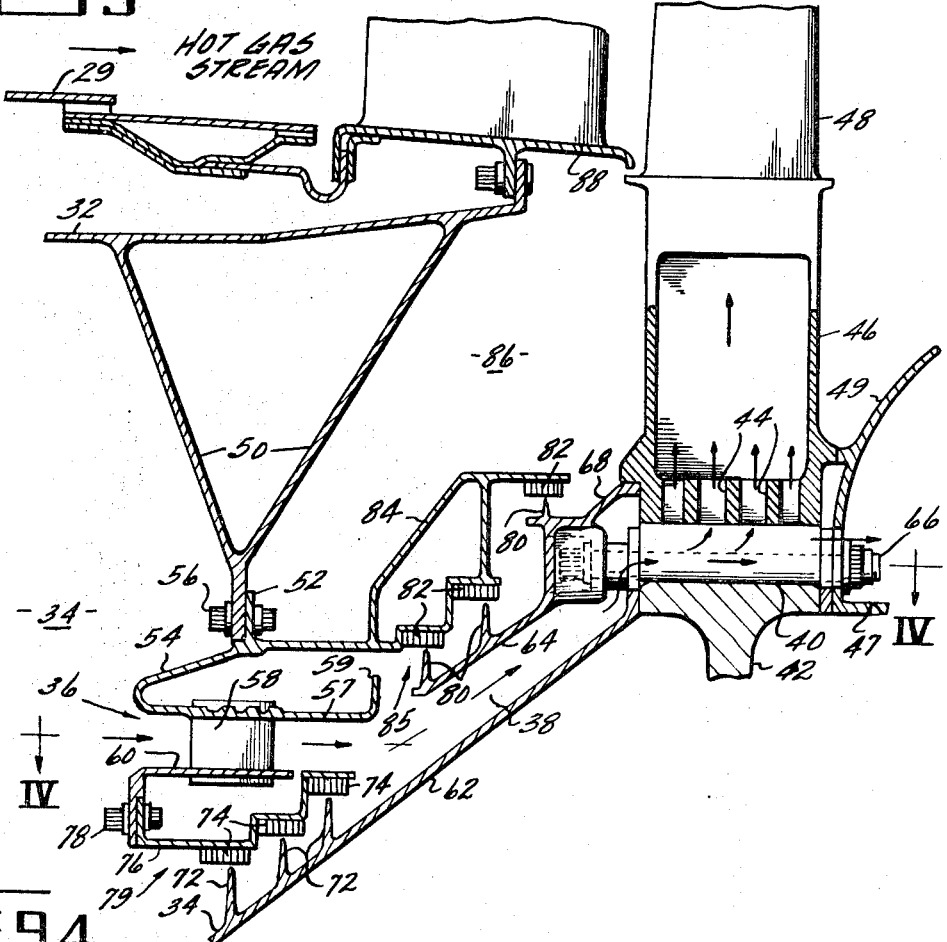

3,565,545
COOLING OF TURBINE ROTORS IN GAS
TURBINE ENGINES
Melvin Bobo, 5629 Oakvista Drive, Cincinnati, Ohio
45227; Bruce O. Buckland, 1711 Randolph Road,
Schenectady, N.Y. 12304; and Eugene E. Stoeckly,
1401 Holman View Drive, Cincinnati, Ohio 45215
Filed Jan. 29, 1969, Ser. No. 794,859
Int. Cl. F01d 5/08
U.S. Cl. 416—90
1 Claim

ABSTRACT OF THE DISCLOSURE

The disclosure shows a gas turbine engine having a compressor, combustor, and turbine sequentially arranged. A rotating, air entry chamber is formed at the base of the tangs of turbine buckets, which project from the turbine rotor into the hot gas stream from the combustor. A relatively stationary, annular nozzle forms the entrance to this rotating chamber. Air is ducted from the discharge of the compressor to this nozzle. The nozzle is provided with vanes which accelerate the compressor discharge air into the rotating chamber which is at a lower pressure. The nozzle imparts, to the cooling air, a velocity vector having a component relative to the rotating chamber (and turbine rotor), which is generally axial. The air is reduced in static temperature, as it is accelerated through the nozzle, and energy losses are minimized due to the velocity vector of the cooling air being essentially axial relative to openings in the turbine rotor, which the air enters to flow through passageways providing an internal cooling mechanism for the turbine buckets.

---

The invention described and claimed in the United States patent application herein resulted from work done under United States Government contract FA-SS-66-6. The United States Government has an irrevocable, nonexclusive license under said application to practice and have practiced the invention claimed herein, including the unlimited right to sublicense others to practice and have practiced the claimed invention for any purpose whatsoever.

The present invention relates to improvements in gas turbine engines and, more particularly, to improvements in the cooling of turbine rotors in such engines.

Gas turbine engines conventionally comprise a compressor for pressurizing air to support combustion of fuel in the generation of a hot gas stream. This hot gas stream drives a turbine, connected to the compressor, and is then utilized to obtain a propulsive output or a powered shaft output from the engine. In order to obtain higher operating efficiencies and power outputs, the hot gas stream, when it passes through the turbine, is at a temperature exceeding the physical capabilities of the materials from which the turbines are fabricated, particularly considering the high stresses which are imposed on the turbine rotor. This has led to many proposals for providing cooling systems for the turbine, particularly for those portions exposed to the hot gas stream. One such proposal is that relatively cool air, derived from the engine compressor, be directed through passageways formed in the turbine buckets. The cooling effect assures that the strength capabilities of the bucket material are not exceeded, as well as maintaining the buckets below a temperature at which melting or burning might occur.

One of the more difficult problems encountered in cooling turbine rotors in this fashion is in internally ducting the cooling air from the compressor to the turbine which is rotating at a high speed. In usual practice the cooling air is bypassed internally of the engine combustor and then introduced into passageways formed in the turbine rotor. Generally, the entrances to the rotor passageway have a peripheral speed of several hundred to as high as many thousand feet per minute.

Thus, it has been inherent in the delivery of cooling air to the turbine rotor that a relatively large amount of work has been done on the cooling air to introduce into the rotor. The work input results in an increase in temperature of the cooling air as it enters the turbine. This, in turn, reduces the cooling effectiveness of a given mass of air in reducing the temperature of the buckets and other components of the turbine which are to be cooled thereby.

The object of the invention is to minimize such work input to cooling air and, further, to reduce the temperature of the cooling air entering a turbine rotor to cool the components thereof.

Broadly stated, the above ends are attained in a gas turbine engine, having a turbine rotor with blades projecting therefrom, by the provision of an entry chamber which is defined, at least in part, by the turbine rotor. Cooling air is introduced into this entry chamber by nozzle means which cause a reduction in the static temperature of the cooling air, which is then circulated from the chamber to passageways in the turbine rotor which open into this chamber. Preferably, the nozzle means are angled so that the cooling air entering this chamber has a vector component relative to the rotor which is generally in an axial direction, whereby there will be a minimum of work input and consequent heat rise to the cooling air as it is introduced into the passageways which provide an internal cooling mechanism for the turbine buckets. Put another way, the circumferential velocity components of the cooling air and the rotor passage entrances are approximately equal.

In a more specific sense, these ends are attained by the provision of such a chamber which is further defined by a pair of spaced, annular sealing members integral with the turbine rotor and facing an annular, bladed nozzle. The rotating chamber is maintained at a static pressure less than the pressure of the cooling air at its point of extraction from the compressor and greater than the static pressure of the gas stream entering the first rotating blade row of the turbine, whereby any leakage that occurs from the coolant chamber will have a minimal effect on the cooling action provided for the turbine.

The above and other related objects and features of the invention will be apparent from a reading of the following description of the disclosure found in the accompanying drawings and the novelty thereof pointed out in the appended claims.

In the drawings:

FIG. 1 is a view in outline form, with portions broken away, of a gas turbine engine in which the present invention is embodied;

FIG. 2 is a perspective view of the cooling mechanism of the present invention;

FIG. 3 is a longitudinal section of this cooling mechanism; and

FIG. 4 is a section taken on line IV—IV in FIG. 3.

The gas turbine engine 10, seen in FIG. 1, comprises an axial flow compressor 12 which pressurizes air to support combustion of fuel in a combustor 14. The hot gas stream generated in the combustor 14 passes through and drives a turbine 16. The hot gas stream then enters an afterburner or reheat chamber 18, where additional fuel is selectively supplied and burned before the gas stream is discharged through a nozzle 20 to provide a propulsive force from the engine.

The turbine 16 comprises a compositely formed rotor 24 which is joined by a shaft 26 to the compositely formed rotor 28 of the compressor 12. The combustor 14 is of an annular type comprising liners 29 which are spaced from an outer casing member 30 and an inner casing 32 to provide a flow path for cooling air and secondarly combustion air entering within the liners 29. Pressurized air discharged from the compressor 12 not only flows into these annular spacings and the combustion chamber but also flows, through openings indicated at 33, into a chamber 34 between the inner casing member 32 and the engine rotor comprising the shaft 26 and a portion of the compressor rotor 24. This air provides a coolant fluid for the turbine rotor in a manner now to be described.

At the aft end of the chamber 34 there is an annular nozzle 36 which directs the cooling air into an annular, rotating, entry chamber 38. The cooling air then passes from the entry chamber 38 through openings 40 formed in a turbine rotor disc 42. The cooling air then passes through passageways 44 formed in the bases of tangs 46 which are employed to mount blades 48 on the disc 42. The blades 48 are provided with coolant passageways, through which the air is directed, to provide the desired cooling mechanism for the blades. Cooling air may also be directed from the holes 40 to a second turbine stage connected to the first stage disc 42 by a shaft member 47 and heat shield 49.

The nozzle 36 is supported from the inner casing 32 by inwardly projecting annular struts 50, to which an outer rim 52 of the nozzle 36 is secured by bolts 56. The nozzle 36 is compositely formed and comprises an annular, U-shaped frame 54, the inner leg of which functions as the outer shroud 57. Nozzle vanes 58 project inwardly of the outer shroud 57 and connect to it an inner shroud 60.

As was pointed out above, cooling air is directed from the nozzle 36 into the rotating chamber 38. This rotating chamber is defined in part by a conical shaft 62 (which comprises a portion of the turbine rotor 24) and a flange 64 which is spaced radially outwardly from the conical shaft 62. The flange 64, as well as the shaft 62, is secured to the disc 42 by bolts 66. The flange 64 is formed integrally with a circumferential rim 68 which, in combination with the heat shield 49, locks the tangs 46 axially on the disc 42.

Labyrinth teeth 72 are formed on the conical shaft 62 and cooperate with sealing surfaces 74 on a ring-shaped member 76, which is secured to the inner nozzle shroud 60 by bolts 78. This provides a rotating fluid seal 79 between the chamber 34 and the chamber 38.

Teeth 80 project outwardly from the rotating flange member 64 and cooperate with sealing surfaces 82 on a ring-shaped member 84 which is formed as an integral extension of the frame 54. The teeth 80 and the surfaces 85 provide a rotating fluid seal 83 between the chamber 38 and a chamber 86. The chamber 86 is defined by the stationary member 50 and 84, and the forward surfaces of the rotating tangs 46. This chamber is also defined in part by the inner shroud 88 of the nozzle diaphragm, which directs the hot gas stream to the blade 48 of the turbine rotor. The chamber 86, due to leakage between the shroud 88 and the rotating blades 48, is pressurized to approximately the static pressure level of the hot gas stream, directed to the turbine blades.

The relative pressures of the chambers 34 and 38 are established to obtain a desired flow of cooling air through the nozzle 36. The chamber 34 is pressurized from the discharge of the axial flow compressor and is substantially at that pressure level. The chamber 38 is at a lower pressure level and the chamber 86 is at yet a lower pressure. Due to the pressure differential across the nozzle 36, air will be induced to flow therethrough. As the air flows through the nozzle 36, it will be accelerated in an angular direction represented by the velocity vector $V_a$. There will also be a concurrent reduction in static temperature as a portion of the thermal energy of the air is converted to kinetic energy.

Not only is the air reduced in static temperature as it enters the chamber 38, it is given a velocity vector $V_a$ (FIG. 4), angled in the direction of rotation of the turbine rotor. The turbine rotor has a circumferential velocity vector $V_t$. The circumferential component of vector $V_a$ is slightly less than the turbine vector $V_t$, resulting in a vector $V_r$ representing the relative velocity between the cooling air and the turbine rotor. It will be seen that the relative vector $V_r$ is disposed in a generally axial direction and is thus substantially aligned with the openings of the holes 40 which provide the entry to the passageways for conducting cooling air to and through the blades 48. The cooling air is ultimately discharged into the hot gas stream from the blades. The direction of the relative vector $V_r$ provides a minimum of relative movement between the cooling air and the entrance to the holes 40. This, in turn, essentially eliminates work input to the cooling air by the turbine rotor and resultant heat increases as the cooling air is introduced into the passageway means for cooling the blades 48. There is some radially outward drift of air from the nozzle 36 to the holes 40. Also, there is a small amount of relative tangential motion, since the relative vector $V_r$ is not in exact alignment with the access of the holes 40. These losses associated with these minor relative motions are insignificant compared to what is accepted in the conventional practice of inducing flow of cooling air from a plenum into passageway entrances on a turbine rotor having high peripheral speeds.

The vectors indicated in solid lines in FIG. 4 illustrate the operating condition of a new or rebuilt engine and are established on the basis that the pressure in chamber 38 is controlled as a function of the restrictive effect or combined orifice effect of the several coolant passageways to and through the turbine blades 48. In the actual operating life of the engine, it is to be expected that the air seals 79 and 85 will lose their effectiveness and that there will be some leakage thereacross. The pressure differential across the seal 79 is relatively small and the controlling factor is the leakage across the seal 85. When such leakage occurs, there will be a reduction in the pressure in chamber 38 and, consequently, a greater pressure differential across the nozzle 36. When this occurs, the cooling air, discharged from the nozzle 36 into the chamber 38, will change in value and angle, as illustrated by the vector $V'_a$ in FIG. 4. The circumferential component of the vector $V'_a$ will approach or exceed the value of the rotor vector $V_t$, causing a shift in the relative vector, as illustrated by the vector $V'_r$. It has been found that even with an increase of several fold of the leakage across the seal 85, the relative vector $V_r$ will be maintained substantially, or generally, in axial direction to maintain the benefits of minimizing energy losses in a practical fashion over the life of the engine.

The described invention reduces the actual temperature of the cooling air supplied to the turbine through two mechanisms. First, there is a static temperature drop inherently produced in the cooling air as it passes through the nozzle 36 and is accelerated thereby. This is to say that, relative to the rotor, the total temperature has been reduced since the air is moving in the same general direction as the rotor. This reduced temperature is effectively maintained by eliminating, or essentially eliminating, energy input to the air in ducting it into the high speed rotating disc 42, through the holes 40, as was above described in detail.

It will also be noted that by employing rotating elements (64 and 62) downstream of the nozzle 36 to define the air entry chamber, there are a minimum of losses associated with the cooling air, once it has been accelerated in substantially a tangential direction to get the desired relative vector relationship to the rotating disc. Further in this connection, the outer shroud 57 of the nozzle 36 is provided with a lip 59 to minimize entrapment of air in the pocket behind this shroud.

While the disclosure is based on the utilization of air as the cooling medium, it will be apparent that other fluids would be the full equivalent of air insofar as at least certain of the present inventive concepts are concerned. This factor should be borne in mind in determining the scope of the invention which is defined by the following claim.

Having thus described the invention, what is claimed as novel and desired to be secured by Letters Patent of the United States is:

1. A gas turbine engine comprising:
   a compressor including a rotor, for pressurizing an air stream,
   a combustor in which the pressurized air stream supports combustion of fuel to generate a hot gas stream,
   an axial flow turbine including a disc from which blades project radially into the hot gas stream discharged from the combustor,
   a conical shaft secured to said disc and extending toward said compressor rotor,
   means connecting said conical shaft to said compressor rotor,
   an annular cooling air entry chamber defined in part by a portion of the upstream surface of said conical shaft and a conical flange spaced from said conical shaft surface at its outer periphery, and in part by annular stationary structure,
   fluid sealing means between the stationary portions of said air entry chamber and said conical shaft surface and said conical flange respectively,
   said annular stationary structure including a pair of spaced annular shrouds having radial vanes extending therebetween and forming an annular nozzle entrance for said air entry chamber,
   means for ducting pressurized air from the compressor to said nozzle for introduction into said air entry chamber,
   passageway means extending from said air entry chamber to said disc and through said blades whereby the latter will be cooled by the air from said air entry chamber,
   said passageway means opening into said air entry chamber in an axial direction,
   said nozzle vanes being angled in the direction of turbine rotor rotation and imparting a relative velocity vector to the air which is essentially axial and in original operation is somewhat counter to rotor rotation so that the vector relation will remain essentially axial with normal degradation of the chamber seals.

References Cited

UNITED STATES PATENTS

| | | | |
|---|---|---|---|
| 2,831,653 | 4/1958 | Alford | 415—178 |
| 2,988,325 | 6/1961 | Dawson | 415—178 |

FOREIGN PATENTS

| | | | |
|---|---|---|---|
| 585,350 | 2/1947 | Great Britain | 415—177 |

EVERETTE A. POWELL, JR., Primary Examiner

U.S. Cl. X.R.

416—95; 415—175